Patented Sept. 2, 1930

1,774,882

UNITED STATES PATENT OFFICE

CHARLES W. GIRVIN, OF LONG BEACH, CALIFORNIA, ASSIGNOR, BY MESNE ASSIGNMENTS, TO GENERAL SALT COMPANY, OF LONG BEACH, CALIFORNIA, A CORPORATION OF CALIFORNIA

PROCESS OF RECOVERING IODINE

No Drawing.     Application filed February 8, 1927. Serial No. 166,815.

This invention relates to the recovery of iodine, preferably from natural brines, and more particularly to the process of adsorbing free iodine from its water solution by means of charcoal and then recovering the iodine from the charcoal.

Heretofore the well known adsorptive and absorptive capacity of charcoal for iodine, has been utilized in obtaining chemically free iodine from sea water and the like, but the subsequent recovery of the liberated iodine adsorbed by the charcoal, while theoretically possible and subject to demonstration in its laboratory and experimental stages, possesses inherent difficulties in commercial operation of the process.

The attempts heretofore made to separate the iodine from charcoal on a commercial scale have involved a more or less complicated procedure and the use of economically prohibitive chemicals; while the present invention provides for recovery of the iodine in its elementary state at a cost at which it is readily marketable and by use of an extremely simple process requiring no special precautions or expert supervision.

By means of my improved process the chemically free iodine adsorbed by the charcoal is converted to a water soluble gas which may be readily washed free from the charcoal and from which the iodine may then be liberated by any suitable oxidation. The water soluble gas containing the iodine may be formed by a chemical reaction which is inexpensive and easy to perform and which is particularly applicable to charcoal-adsorbed iodine, the reaction releasing nascent hydrogen which immediately combines with the iodine to form hydriodic acid, and employment of my particular chemical reaction in connection with charcoal-adsorbed iodine, as distinguished from iodine adsorbed by some other medium, insuring penetration and adsorption of the gases formed by the reaction so as to reach all of the iodine, but said gases of my particular reaction combining with only the iodine and not with the various undesirable fatty acids, etc. which are always present with the iodine. The necessary reaction is preferably obtained by treating the charcoal with a water solution of a reducing agent which is characterized by the presence of hydrogen in its formula, so that the complete reaction may be expressed as an oxidation of the reducing agent by the oxygen of the water, thereby releasing nascent hydrogen from the water, which will combine with the iodine instead of with the reducing agent since the latter already contains hydrogen. The nascent hydrogen and the iodine thus form hydriodic acid which is soluble in water and thus readily washed from the charcoal.

The use of an acid solution as thus described rather than an alkaline or neutral solution, and the use of such acid solution in connection with charcoal-adsorbed iodine as distinguished from iodine adsorbed by some other medium, results in the solvent being adsorbed by the charcoal so as to penetrate and reach all of the iodine, whereas an alkaline or neutral solvent will not be so adsorbed by charcoal as to insure its reaction upon all of the iodine. Furthermore the acid solution will not react upon foreign ingredients such as fatty acids which are always present with the iodine, while an alkaline or neutral solution will extract such undesirable acids, etc. along with the iodine; and the gases resulting from the use of an acid solution are readily adsorbed by charcoal without necessitating agitation, while other adsorbing media will not cause such complete penetration of the solvent as to result in extraction of all of the iodine.

In adopting the process to practical use a water solution of either an acid salt in a lower state of oxidation or the acid from which the salt is derived, may be used for the desired reaction with charcoal-adsorbed iodine, and as an example of economical and simple operation I may use an acid or its corresponding acid salt derivative of sulphur characterized by the acid radicle $SO_3$.

In practice I have found it advantageous to use an alkali metal acid sulphite or simply the corresponding sulphurous acid; and since sodium bisulphite ($NaHSO_3$), or sulphur dioxide which combines with water to form sulphurous acid ($H_2SO_3$), are inexpensive and commercially available, water solutions of these substances have been preferably used, the process being thus represented by the following equations for the acid salt and the corresponding acid respectively:

$$I_2 + NaHSO_3 + H_2O = 2HI + NaHSO_4$$
$$I_2 + H_2SO_3 + H_2O = 2HI + H_2SO_4$$

The iodine which may be thus recovered from charcoal by a water solution of either sodium bisulphite or sulphur dioxide, is present as iodides in natural brines to a very small extent, say 50 to 150 mgm. of iodine per litre of solution; and the iodine may be chemically liberated in its elementary state but remain in solution in the brine, by adding suitable oxidizing agents, preferably sulphuric acid and sodium nitrite.

This brine solution of free iodine is then brought into contact with charcoal, preferably suitably activated charcoal, which adsorbs the iodine. The same charcoal is preferably subjected to succeeding batches of the brine until its adsorbing power is saturated, which point of saturation will be reached when the charcoal contains an amount of iodine equal to from 20% to 40% of its own weight, depending upon the kind and grade of charcoal and its degree of activation.

When the charcoal is completely saturated, or before, as governed by economical conditions, it may be treated in a suitable tank with a water solution of either the sulphur dioxide or sodium bisulphite, and the iodine is thus converted to hydriodic acid as previously described.

The hydriodic acid is soluble in water and consequently may be readily washed free of the charcoal, the washing water containing the hydriodic acid and the other products of the reaction, being then suitably treated for recovery of the iodine, by means of any practical oxidizing agent followed by filtration or distillation.

While I have thus described practical operation of the process by the use of sulphur dioxide or sodium bisulphite with charcoal-adsorbed iodine, it is obvious that the charcoal-adsorbed iodine may be treated with water solutions of any other inexpensive and commercially available salts or acids which contain replaceable hydrogen and have a tendency to undergo further oxidation in the presence of iodine and water to produce a similar reaction whereby the gases resulting from the reaction are completely adsorbed by the charcoal so as to reach all of the iodine and extract the same without at the same time also extracting undesirable fatty acids, etc. which have been adsorbed by the charcoal. The essentials of the reaction are the use of charcoal as the adsorbing medium and the ready conversion of the acid salt or acid to a higher state of oxidation by the oxygen of the water, thereby releasing nascent hydrogen which will not combine with the acid salt or acid since they already contain hydrogen, and will be completely adsorbed by the charcoal so as to unite with all of the iodine to form hydriodic acid which may be conveniently washed from the charcoal and then oxidized to form the elementary iodine.

It is therefore to be noted that in the following claims the terms "reducing agent" and "containing an acid radicle in a lower state of oxidation" are to be construed as referring to either an acid or its salt which is characterized as being readily subject to further oxidation, as for example an acid and its salts containing the acid radicle $SO_3$ as opposed to the acid radicle $SO_4$; and the term "containing hydrogen in its chemical formula" is to be construed as applying to either an acid or its corresponding acid salt since the latter also contains replaceable hydrogen.

The recovery of iodine from charcoal by the use of an acid solution, either in the form of an acid or its corresponding acid salt, has a further marked advantage over employment of either a neutral or alkaline salt or the use of some adsorbing medium other than charcoal, in that the rate of sedimentation in an acid solution is appreciably greater than with an alkaline or neutral solution. As a consequence finely pulverized charcoal, which has greater absorptive and adsorptive capacity than the granulated product, may be successfully used in the present process since it will readily settle in the acid solution whereas it can only be separated with difficulty from a neutral or alkaline solution.

I claim:

1. In the method of recovering iodine from natural brines by adsorption on charcoal, the steps which comprise treating charcoal containing iodine with a water solution of an acidic reducing agent and washing the resulting hydriodic acid free from the charcoal.

2. The method of recovering iodine from natural brines which consists of liberating the iodine, adsorbing the liberated iodine by charcoal, treating the charcoal with a water solution of an acidic reducing agent, washing the resulting hydriodic acid free from the charcoal, and freeing the iodine from the hydriodic acid by an oxidizing agent.

3. In the method of recovering iodine from natural brines by adsorption on charcoal, the steps which comprise treating charcoal containing iodine with a water solution of a derivative of sulphur comprising an acidic reducing agent, and washing the resulting hydriodic acid from the charcoal.

4. In the method of recovering iodine from natural brines by adsorption on charcoal, the steps which comprise treating charcoal containing iodine with a water solution of an acidic compound including an acid radicle in a lower state of oxidation, and washing the resulting hydriodic acid from the charcoal.

5. In the method of recovering iodine from natural brines by adsorption on charcoal, the steps which comprise treating charcoal containing iodine with a water solution of an acid salt reducing agent, and washing the resulting hydriodic acid from the charcoal.

6. In the method of recovering iodine from natural brines by adsorption on charcoal, the steps which comprise treating charcoal containing iodine with a water solution of an alkali metal acid salt containing an acid radicle in a lower state of oxidation, and washing the resulting hydriodic acid from the charcoal.

7. In the method of recovering iodine from natural brines by adsorption on charcoal, the steps which comprise treating charcoal containing iodine with a water solution of an acid sulphite, and washing the resulting hydriodic acid from the charcoal.

8. In the method of recovering iodine from natural brines by adsorption on charcoal, the steps which comprise treating charcoal containing iodine with a water solution of an alkali metal acid sulphite, and washing the resulting hydriodic acid from the charcoal.

9. In the method of recovering iodine from natural brines by adsorption on charcoal, the steps which comprise treating charcoal containing iodine with a water solution of sodium bisulphite, and washing the resulting hydriodic acid from the charcoal.

10. In the method of recovering iodine from a solution of chemically free iodine, the steps which comprise adsorbing the iodine by charcoal, and treating the charcoal-adsorbed iodine with a water solution of an acidic compound including an acid radicle in a lower state of oxidation.

In testimony whereof he has affixed his signature to this specification.

CHARLES W. GIRVIN.